(12) United States Patent
Chuang et al.

(10) Patent No.: US 11,169,378 B2
(45) Date of Patent: Nov. 9, 2021

(54) NEAR-EYE DISPLAY APPARATUS

(71) Applicant: Coretronic Corporation, Hsin-Chu (TW)

(72) Inventors: Fu-Ming Chuang, Hsin-Chu (TW); Chuan-Chung Chang, Hsin-Chu (TW); Hsin-Hsiang Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 177 days.

(21) Appl. No.: 16/596,763

(22) Filed: Oct. 9, 2019

(65) Prior Publication Data
US 2020/0117009 A1 Apr. 16, 2020

(30) Foreign Application Priority Data
Oct. 15, 2018 (CN) .......................... 201811196307.8

(51) Int. Cl.
*G02B 27/01* (2006.01)
*G02B 3/00* (2006.01)
*G02B 5/02* (2006.01)

(52) U.S. Cl.
CPC ....... *G02B 27/0172* (2013.01); *G02B 3/0006* (2013.01); *G02B 5/0278* (2013.01); *G02B 2027/0118* (2013.01)

(58) Field of Classification Search
CPC .............. G02B 3/0006; G02B 27/0172; G02B 27/017; G02B 27/01; G02B 27/0101; G02B 5/0278; G02B 5/0273; G02B 2027/0118
(Continued)

(56) References Cited

U.S. PATENT DOCUMENTS 5,325,386 A * 6/1994 Jewell .................... H01S 5/423
372/50.124
8,705,177 B1 4/2014 Miao
(Continued)

FOREIGN PATENT DOCUMENTS

CN 103261942 8/2013
CN 106019599 10/2016
(Continued)

OTHER PUBLICATIONS

"Office Action of China Counterpart Application", dated May 8, 2021, p. 1-p. 8.
(Continued)

*Primary Examiner* — William R Alexander
(74) *Attorney, Agent, or Firm* — JCIPRNET

(57) ABSTRACT

A near-eye display apparatus is configured to be disposed in front of at least one eye of a user and includes an illumination system, a display device, and a micro-lens array. The illumination system is configured to provide an illumination beam including sub-illumination beams. The display device is located on a transmission path of the illumination beam. The sub-illumination beams form corresponding sub-illumination regions on the display device, and the display device is configured to convert the sub-illumination beams irradiating the display device and corresponding to the sub-illumination regions into sub-image beams. An exit angle of each sub-image beam emitted from the display device is less than or equal to 20 degrees. The near-eye display apparatus provided herein is capable of eliminating stray light and characterized by good quality.

15 Claims, 12 Drawing Sheets

(58) Field of Classification Search
USPC ........................................................ 359/630
See application file for complete search history.

(56) References Cited

U.S. PATENT DOCUMENTS

| | | | | |
|---|---|---|---|---|
| 8,777,424 | B2 | 7/2014 | Schreiber et al. | |
| 9,335,548 | B1 | 5/2016 | Cakmakci et al. | |
| 10,634,912 | B2* | 4/2020 | Blum | G02B 27/0172 |
| 2004/0227063 | A1* | 11/2004 | Viinikanoja | G02B 27/646 |
| | | | | 250/216 |
| 2009/0268303 | A1* | 10/2009 | Takai | G02B 3/0056 |
| | | | | 359/626 |
| 2016/0065921 | A1* | 3/2016 | Sieler | G02B 27/0101 |
| | | | | 348/757 |
| 2017/0039772 | A1 | 2/2017 | Mukawa | |
| 2017/0357100 | A1 | 12/2017 | Ouderkirk et al. | |
| 2019/0265476 | A1* | 8/2019 | Blum | G02B 27/0149 |
| 2020/0363708 | A1* | 11/2020 | Guo | G02F 1/133308 |

FOREIGN PATENT DOCUMENTS

| | | |
|---|---|---|
| CN | 107664839 | 2/2018 |
| JP | H10319342 | 12/1998 |
| TW | I378299 | 12/2012 |
| TW | I565971 | 1/2017 |

OTHER PUBLICATIONS

David L. Guyton et al., "Remote optical systems for ophthalmic examination and vision research." Appl Opt., vol. 26, No. 8, Apr. 15, 1987, pp. 1517-1526.
"Search Report of Europe Counterpart Application", dated Jul. 6, 2020, p. 1-p. 16.
Angel Tolosa et al., "Optical barriers in integral imaging monitors through micro-Köhler illumination", Proc. SPIE, vol. 9495, May 22, 2015, pp. 1-8.
Uwe Vogler et al., "Mask aligner process enhancement by spatial filtering." Proc. SPIE, vol. 8170, Sep. 21, 2011, pp. 1-8.
"Search Report of Europe Counterpart Application", dated Mar. 19, 2020, p. 1-p. 17.

* cited by examiner

NEAR-EYE DISPLAY APPARATUS

CROSS-REFERENCE TO RELATED APPLICATION

This application claims the priority benefit of China application serial no. 201811196307.8, filed on Oct. 15, 2018. The entirety of the above-mentioned patent application is hereby incorporated by reference herein and made a part of this specification.

BACKGROUND OF THE INVENTION

Field of the Invention

The invention relates to a display apparatus, and more particularly, to a near-eye display apparatus.

Description of Related Art

With the progress of display technologies and people's desire for science and technology, the technologies of virtual reality and augmented reality have matured gradually, among which a light field near-eye display (LFNED) having the information of the current light field (i.e., the information described by the vector of a light from all sides of the space passing one point in the space) can achieve the effect of post focus and can thereby provide images with depth information. Therefore, the LFNED is one of the display technologies applicable to resolve the issue of vergence accommodation conflict (VAC), and the LFNED has gradually drawn attention.

Generally, the light field display can be categorized into a space-multiplexing light field display and a time-multiplexing light field display. In the time-multiplexing light field display, a micro-electro-mechanical device is applied to change the position of a virtual image, so as to adjust the clarity of the front and back views. In the space-multiplexing light field display, a display device such as a micro-light emitting diode (micro-LED), a micro-organic light emitting diode (micro-OLED), and a liquid crystal display (LCD) is applied to stack parallax light field sub-images on the retina of a user through an optical device, e.g., a micro-lens array, so that the user is able to view the light field image with the depth information.

However, the light emitting sources of the micro-LED, the micro-OLED, and the LCD adopted by the space-multiplexing LFNED are Lambertian light sources with large light emitting angles, which easily leads to stray light.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention were acknowledged by people of ordinary skill in the pertinent art.

SUMMARY OF THE INVENTION

The invention provides a near-eye display apparatus capable of eliminating stray light and characterized by good quality.

Other advantages can be further illustrated by the technical features broadly embodied and described as follows.

In order to achieve one or a portion of or all of the objectives or other objectives, an embodiment of the invention provides a near-eye display apparatus configured to be disposed in front of at least one eye of a user. The near-eye display device includes an illumination system, a display device, and a micro-lens array. The illumination system is configured to provide an illumination beam including a plurality of sub-illumination beams. The display device is located on a transmission path of the illumination beam. The sub-illumination beams form a plurality of corresponding sub-illumination regions on the display device, and the display device is configured to convert the sub-illumination beams irradiating the display device and corresponding to the sub-illumination regions into a plurality of sub-image beams. An exit angle of each of the sub-image beams emitted from the display device is less than or equal to 20 degrees. The micro-lens array is located on a transmission path of the sub-image beams and configured to transmit the sub-image beams to at least one eye of a user, so as to display at least one virtual image.

In light of the above, the embodiments of the invention at least exhibit one of the advantages or effects below. In one or more embodiments of the invention, the near-eye display apparatus can satisfy illumination requirements of different sub-illumination regions on the display device through the configuration of the sub-illumination beams of the illumination system, whereby the near-eye display apparatus is able to control the light pattern distribution of the sub-image beams. As such, the near-eye display apparatus can control the main exit angles of different sub-image beams and the range of the exit angles to eliminate the stray light and ensure good image quality.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
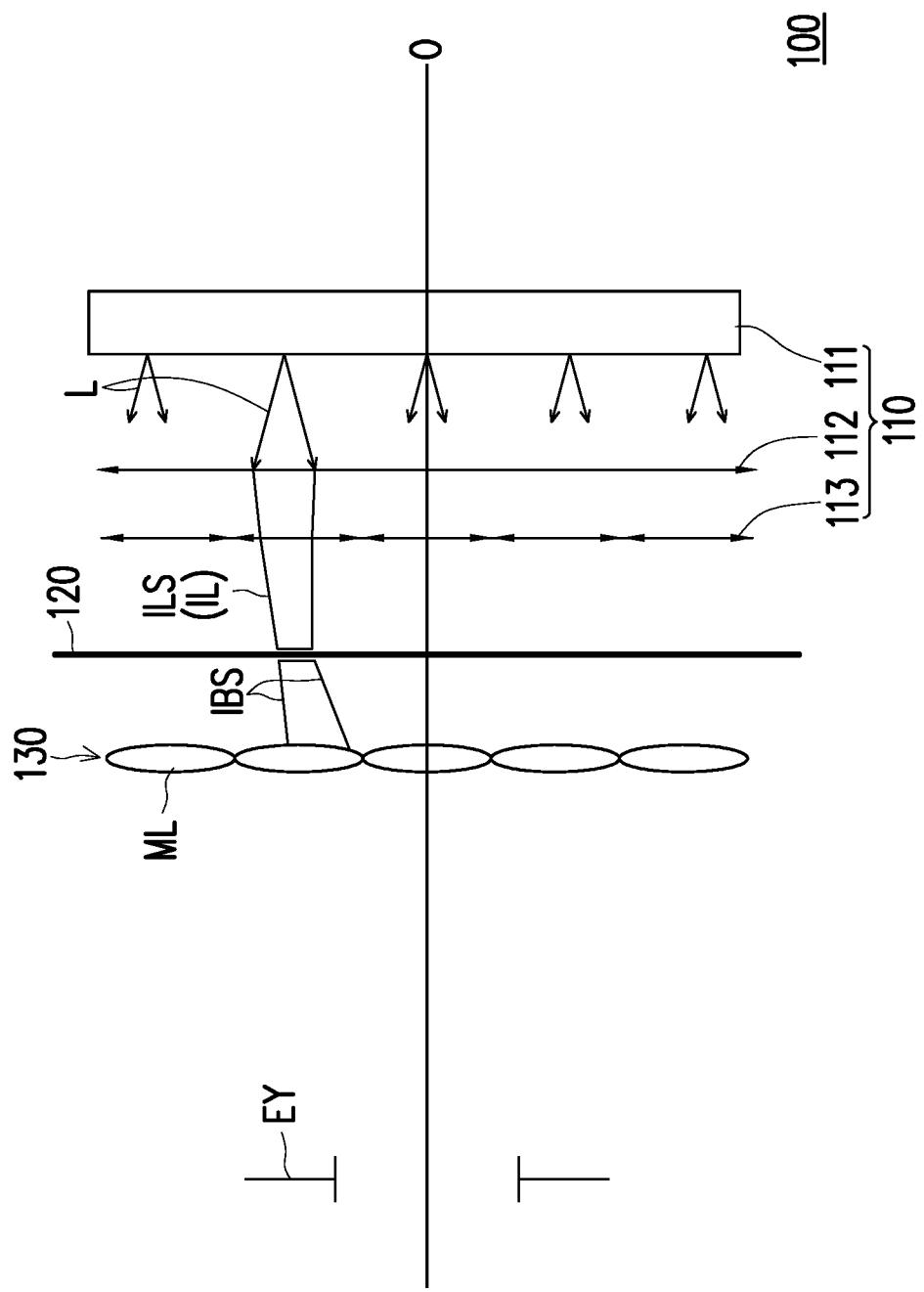
FIG. 1A is a schematic view illustrating a structure of a near-eye display apparatus according to an embodiment of the invention.
Figure 1B:
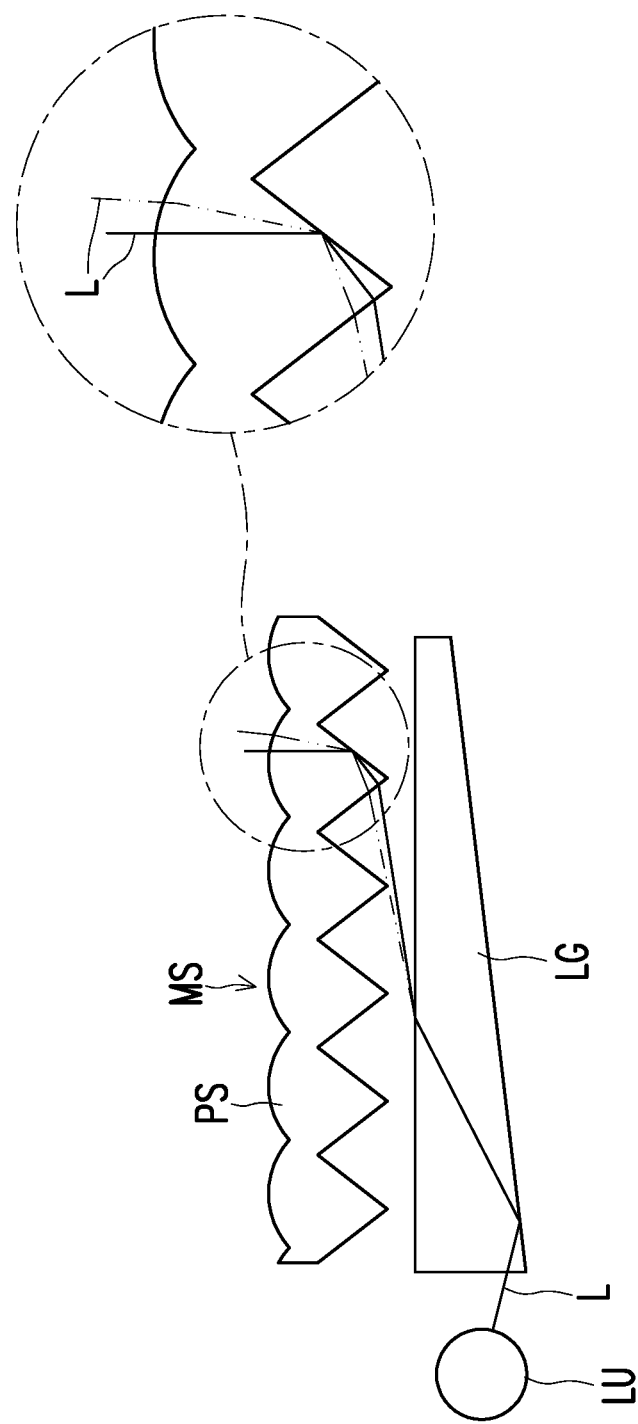
FIG. 1B is a schematic view illustrating a structure of a light source of the illumination system depicted in FIG. 1A.

FIG. 1A is a schematic view illustrating a structure of a near-eye display apparatus according to an embodiment of the invention. FIG. 1B is a schematic view illustrating a structure of an illumination system depicted in FIG. 1A. With reference to FIG. 1A and FIG. 1B, in the present embodiment, a near-eye display apparatus 100 is configured to be disposed in front of at least one eye EY of a user, and the near-eye display apparatus 100 is, for instance, a light field display. The near-eye display apparatus 100 includes an illumination system 110, a display device 120, and a micro-lens array 130. For instance, in the present embodiment, the display device 120 may be a light field display, while the invention is not limited thereto. As such, the image beam provided by the display device 120 contains the information of the current light field (i.e., the information described by the vector of a light from all sides of the space passing one point in the space) can achieve the effect of post focus and can thereby provide images with depth information.

Particularly, as shown in FIG. 1A and FIG. 1B, the illumination system 110 is configured to provide an illumination beam IL including a plurality of sub-illumination beams ILS. To be specific, as depicted in FIG. 1A, the illumination system 110 provided in the embodiment includes a light source 111, a main lens 112, and a lens array 113. For instance, in the embodiment, the light source 111 may include a plurality of light emitting devices adapted to emit a plurality of beams L correspondingly. The main lens 112 may be a Fresnel lens, a liquid crystal lens, or a liquid lens, and the lens array 113 may be a lens element array or a Fresnel lens array, but the invention is not limited thereto. The light source 111 is configured to provide the beams L. For instance, as shown in FIG. 1B, in the embodiment, the light source 111 of the illumination system 110 may include a plurality of light emitting devices LU, a light guide plate LG, and a reverse prism sheet PS. FIG. 1B exemplarily illustrates a cross-sectional view of one light emitting device LU. After the beam L is emitted from the light emitting device LU, the beam L can travel in the light guide plate LG and can be transmitted to the reverse prism sheet PS. Particularly, as shown in FIG. 1B, according to the embodiment, a plurality of micro-structures MS is disposed on the reverse prism sheet PS, and the beams L are emitted from the reverse prism sheet PS at a smaller exit angle, so as to collimate the beams L. For instance, as shown in FIG. 1A and FIG. 1B, according to the embodiment, the light source 111 of the illumination system 110 is a collimated light source, and a range of an exit angle at which each beam L is emitted from the light emitting device LU is from about 10 degrees to about 20 degrees.

As shown in FIG. 1A, in the embodiment, the main lens 112 and the lens array 113 of the illumination system 110 are located on the transmission paths of the beams L emitted from the light source 111, and the main lens 112 is located between the light source 111 and the lens array 113. According to the embodiment, as shown in FIG. 1A, in the embodiment, after the beams L pass through the lens array 113, plural sub-illumination beams ILS are generated to create an illumination beam IL. Besides, as shown in FIG. 1A, in the embodiment, the display device 120 is located on the transmission path of the illumination beam IL and between the illumination system 110 and the micro-lens array 130; thereby, the sub-illumination beams ILS irradiating the display device 120 form a plurality of sub-illumination regions IR on the display device 120. Further explanations are provided below with reference to FIG. 2A and FIG. 2B.

Figure 2A:
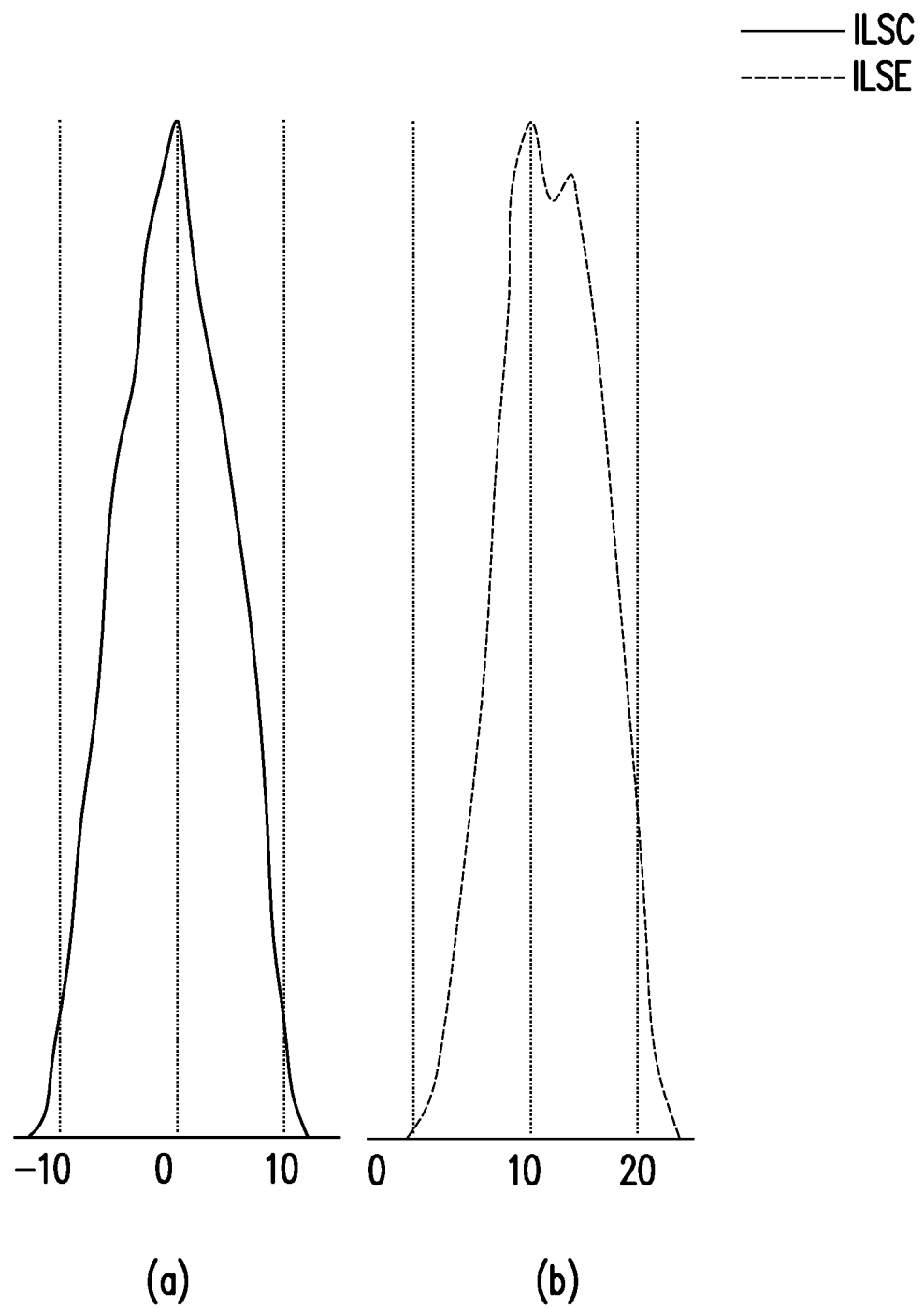
FIG. 2A is a schematic view illustrating distribution of light emitting curves of different sub-illumination beams of the illumination system depicted in FIG. 1A.
Figure 2B:
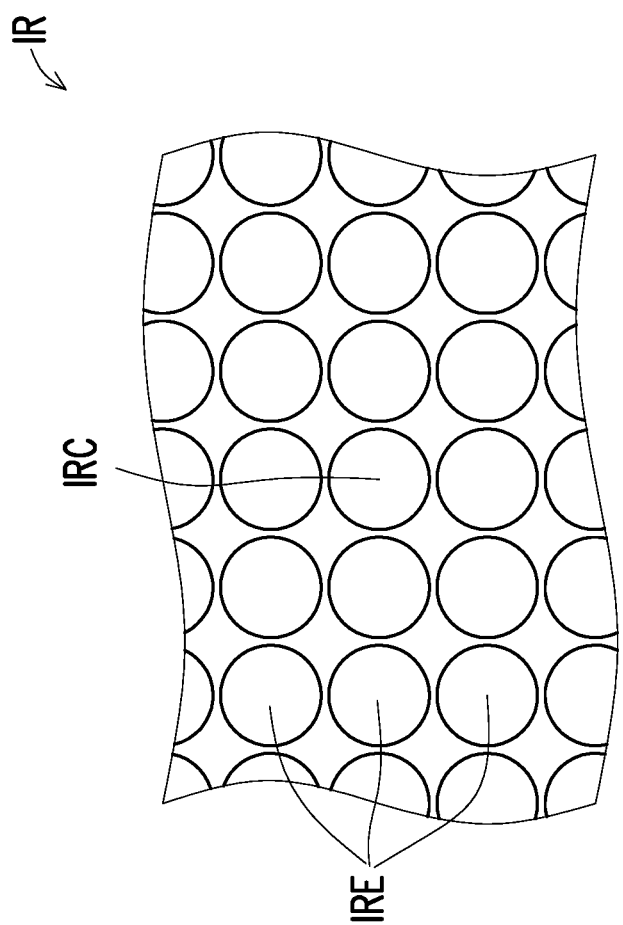
FIG. 2B is a schematic view illustrating that different sub-illumination beams depicted in FIG. 1A form corresponding sub-illumination regions on the display device.

FIG. 2A is a schematic view illustrating distribution of light emitting curves of different sub-illumination beams of the illumination system depicted in FIG. 1A. FIG. 2B is a schematic view illustrating that different sub-illumination beams depicted in FIG. 1A form corresponding sub-illumination regions on the display device. Specifically, as shown in FIG. 2A and FIG. 2B, according to the embodiment, the sub-illumination regions IR include a central sub-illumination region IRC and a plurality of edge sub-illumination regions IRE, and the edge sub-illumination regions IRE collectively surround the central sub-illumination region IRC. To be specific, in the embodiment, a range of an incident angle of the sub-illumination beam ILSC irradiating the central sub-illumination region IRC is equal to a range of incident angles of the sub-illumination beams ILSE irradiating the edge sub-illumination regions IRE. For instance, as shown in FIG. 2A, in the embodiment, the range of the incident angle of the sub-illumination beam ILSC irradiating the central sub-illumination region IRC and the range of the incident angles of the sub-illumination beams ILSE irradiating the edge sub-illumination regions IRE are about 0 degree±10 degrees. Besides, in the embodiment, the main incident angle of the sub-illumination beams ILSE located at the edge sub-illumination regions IRE with respect to the normal of the display device 120 is about 10 degrees. Note that the numeral ranges provided herein are exemplary and for illustrative purposes and should not be construed as limitation to the invention.

Next, with reference to FIG. 1A, in the embodiment, the display device 120 is adapted to convert the sub-illumination beams ILS irradiating the display device 120 and corresponding to the sub-illumination regions IR into a plurality of sub-image beams IBS; that is, the sub-illumination beams ILS irradiate a surface on one side of the display device 120, and the converted sub-image beams IBS are emitted from a surface on the other side opposite to the one side of the display device 120. Particularly, in the embodiment, the sub-illumination beams ILS and the sub-image beams IBS have a one-to-one correspondence relationship; whereby the light pattern distribution of the sub-image beams IBS can be controlled if the illumination requirements of different sub-illumination regions IR are satisfied by adjusting the sub-illumination beams ILS, and the main exit angle at which different sub-image beams IBS are emitted can be controlled to eliminate stray light. Further explanations are provided below with reference to FIG. 3A and FIG. 3B.

Figure 3A:
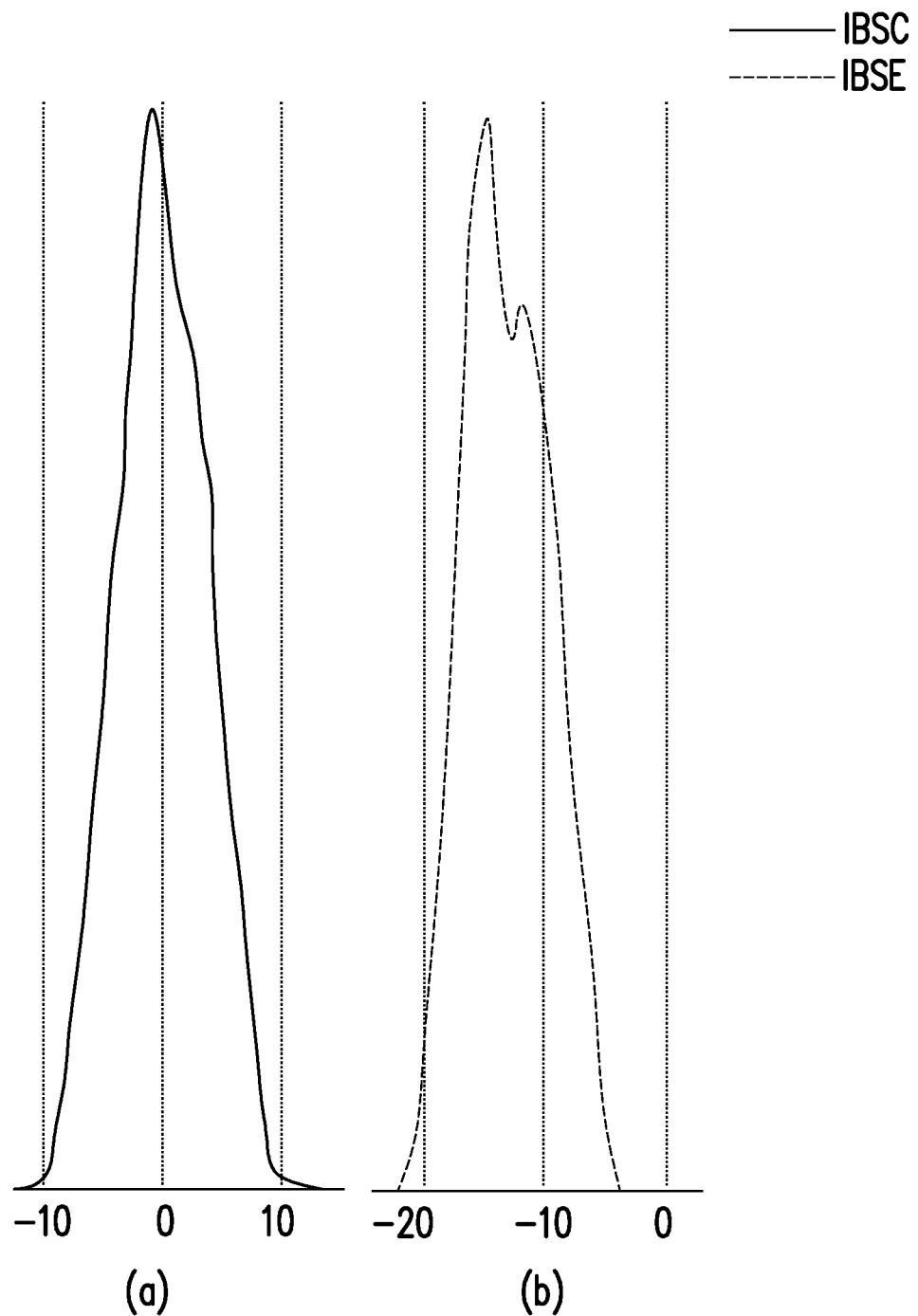
FIG. 3A is a schematic view illustrating distribution of light emitting curves of different sub-image beams of the illumination system depicted in FIG. 1A.
Figure 3B:
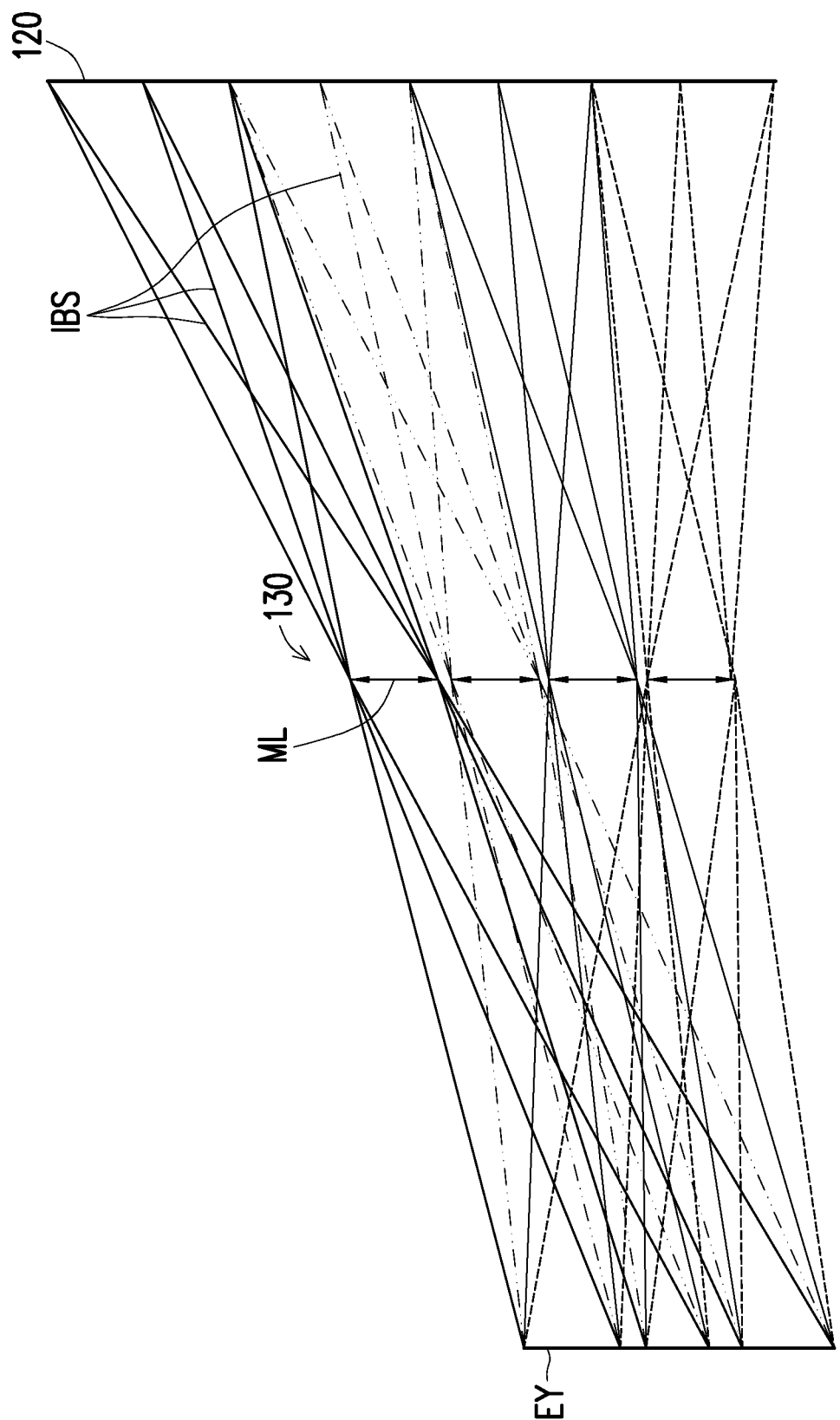
FIG. 3B is a schematic view illustrating imaging light paths of different sub-image beams of the display device depicted in FIG. 1A.

FIG. 3A is a schematic view illustrating distribution of light emitting curves of different sub-image beams of the illumination system depicted in FIG. 1A. FIG. 3B is a schematic view illustrating imaging light paths of different sub-image beams of the display device depicted in FIG. 1A. Specifically, as shown in FIG. 3A and FIG. 3B, in the embodiment, a range of an exit angle of the sub-image beam IBSC located in the central sub-illumination region IRC is equal to a range of exit angles of the sub-image beams IBSE located in the edge sub-illumination regions IRE. Further, as shown in FIG. 3A, in the embodiment, the range of the exit angle of each of the sub-image beams IBS emitted from the display device 120 is less than or equal to 20 degrees. According to the embodiment, the range of the exit angle of the sub-image beam IBSC located in the central sub-illumination region IRC and the range of the exit angles of the sub-image beams IBSE located in the edge sub-illumination regions IRE are about 0 degree±10 degrees. Besides, in the embodiment, the main exit angle of the sub-image beams IBSE located at the edge sub-illumination regions IRE with respect to the normal of the display device 120 is from about 12 degrees to about 15 degrees. Note that the numeral ranges provided herein are exemplary and for illustrative purposes and should not be construed as limitation to the invention.

As shown in FIG. 3B, in the embodiment, the micro-lens array 130 is located on transmission paths of the sub-image beams IBS and adapted to transmit the sub-image beams IBS to at least one eye EY of the user. For instance, in the embodiment, the micro-lens array 130 includes a plurality of micro-lenses ML, each of the micro-lenses ML corresponds to at least one of the sub-image beams IBS, and the at least one of the sub-image beams is transmitted to the at least one eye EY through the corresponding micro-lens ML to display at least one virtual image.

To be specific, as shown in FIG. 1A, FIG. 2B, and FIG. 3B, according to the embodiment, in order for the sub-image beams IBS emitted from the sub-illumination regions IR to be transmitted to at least one eye EY through the corresponding micro-lens ML, the illumination requirements and the main exit angles of these sub-image beams IBS may be slightly different. Therefore, in the embodiment, the light pattern distribution of the sub-image beams IBS can be controlled if the illumination requirements of different sub-illumination regions IR are satisfied by adjusting the sub-illumination beams ILS, and the main exit angle at which different sub-image beams IBS are emitted and the range of the exit angles can be controlled. In addition, as shown in FIG. 3A and FIG. 3B, in the embodiment, the range of the exit angle of each of the sub-image beams IBS emitted from the display device 120 is less than or equal to 20 degrees; therefore, each sub-image beam IBS cannot be easily transmitted to the adjacent micro-lens ML after passing through the corresponding micro-lens ML, and the light leakage may be prevented. As such, the corresponding light field sub-images (i.e., the virtual images displayed in at least one eye EY of the user) formed by the sub-image beams may not have perceivable stray light, and good image quality can be guaranteed.

As such, in the embodiment, the near-eye display apparatus 100 can satisfy the illumination requirements of different sub-illumination regions IR on the display device 120 through the configuration of the sub-illumination beams ILS of the illumination system 110, whereby the near-eye display apparatus 100 is able to control the light pattern distribution of the sub-image beams IBS. Accordingly, the near-eye display apparatus 100 can control the main exit angles of different sub-image beams IBS and the range of the exit angles to eliminate the stray light and ensure good image quality.

Figure 4A:
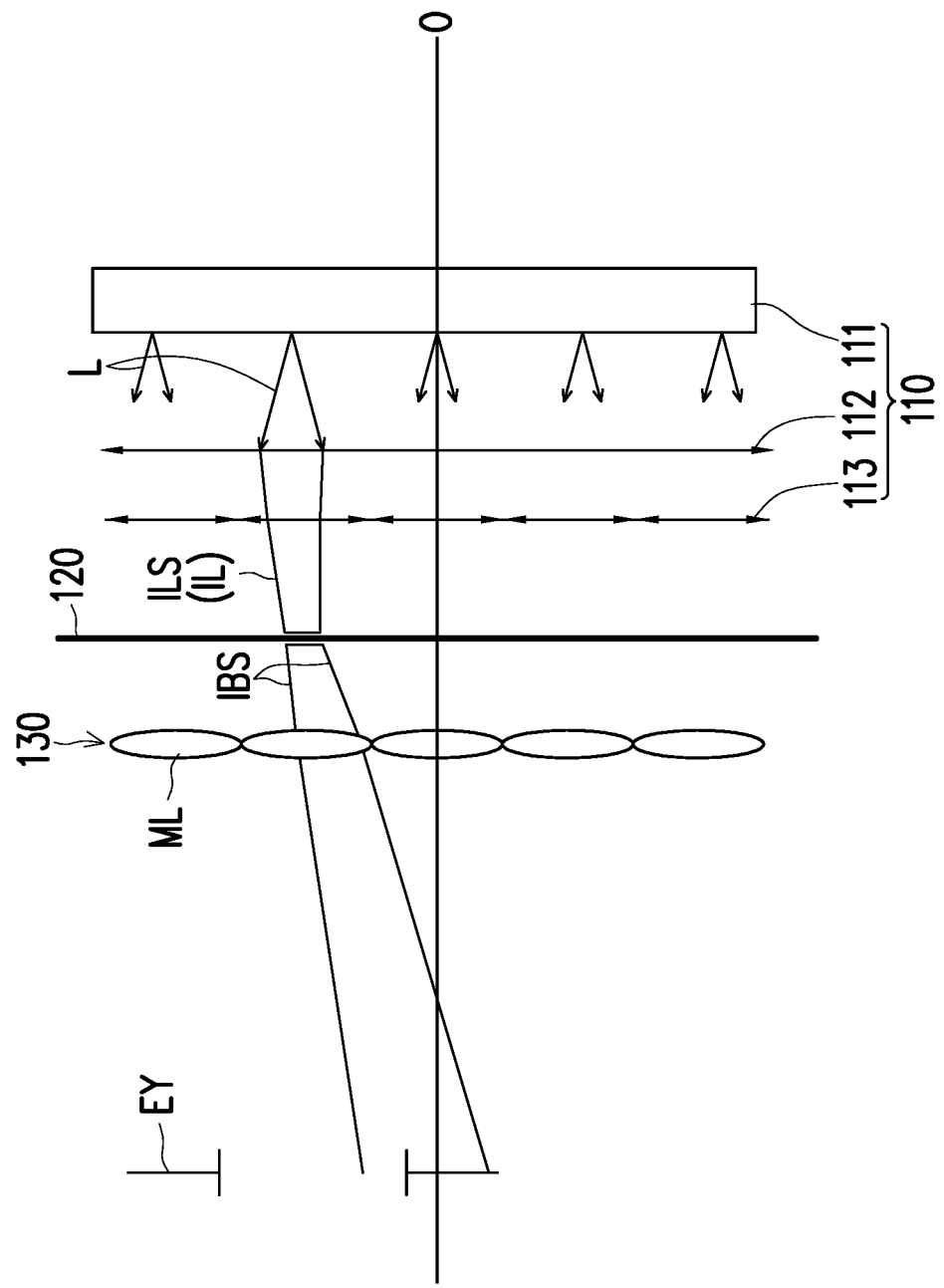
FIG. 4A and FIG. 4B are schematic views illustrating different imaging light paths when a user's eyes deviate from an optical axis of the near-eye display apparatus depicted in FIG. 1A.
Figure 4B:
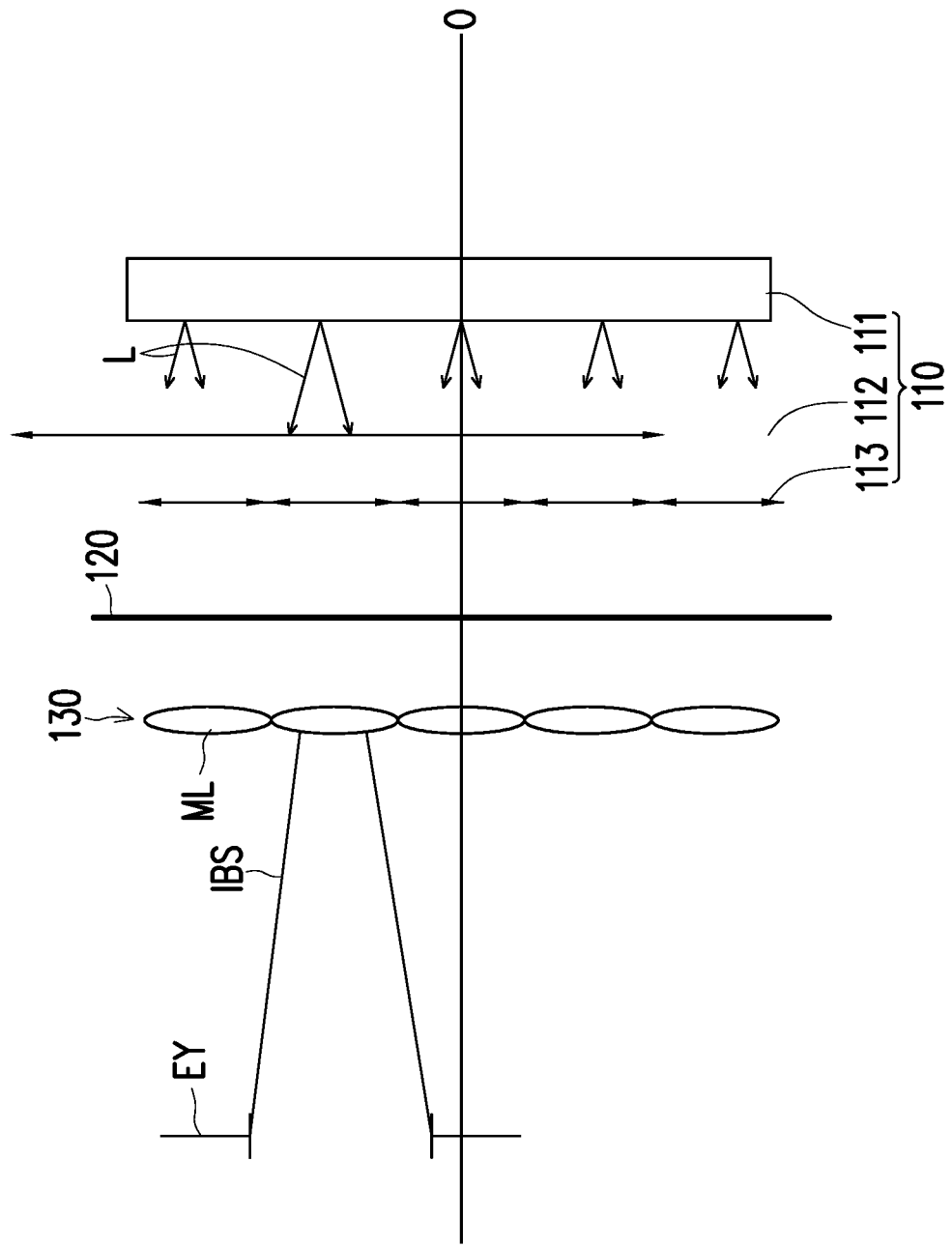

FIG. 4A and FIG. 4B are schematic views illustrating different imaging light paths when a user's eyes deviate from an optical axis of the near-eye display apparatus depicted in FIG. 1A. For instance, as illustrated in FIG. 4A, the pupil of at least one eye EY of the user may not be always located on the optical axis O of the display device 120 accurately and may deviate from the optical axis O of the display device, some sub-image beams IBS may not be able to enter at least one eye EY of the user, and thereby the resultant virtual image may have dark lines. Hence, in the embodiment, the imaging position may be changed by manually or automatically adjusting the position of the main lens 112 of the illumination system 110, so as to allow the sub-image beams IBS to enter at least one eye EY of the user and eliminate the dark lines.

In particular, as shown in FIG. 4B, the near-eye display apparatus 100 provided in the embodiment further has an eyeball detecting device (not shown) adapted to detect the position of the pupil of at least one eye EY of the user, and the main lens 112 is adapted to move relative to the lens array 113. For instance, as illustrated in FIG. 4B, according to the embodiment, the position of the pupil of at least one eye EY of the user deviates in an upward manner in a direction perpendicular to the optical axis O of the display device, the main lens 112 provided in the embodiment can move in an upward manner along the direction perpendicular to the optical axis O. Thereby, the sub-image beams IBS are able to enter at least one eye EY of the user, and the dark lines can thus be eliminated, so as to ensure the near-eye display apparatus 100 to have good image quality.

In the embodiment, the near-eye display apparatus 100 exemplarily adjusts the imaging position by adjusting the position of the main lens 112 of the illumination system 110, but the invention is not limited thereto. According to other embodiments, the imaging position can be adjusted through the arrangement of other types of optical devices, and similar effects can still be achieved. Further explanations are provided below with reference to FIG. 5 to FIG. 6B.

In the previous embodiments, the included angle between the sub-image beams and the display device can be adjusted through adjusting the position of the main lens 112 of the illumination system 110. However, in the known collimated backlight source, an LED or another light source is placed at the center or the focus of the light guide plate having the arc-shaped reverse prisms, so that the beam can be emitted from the light source at a collimated exit angle. Similarly, the exit angle of the collimated beam can be changed or deflected (i.e., the included angle between the sub-image beams and the display device can be changed) through adjusting the position of the light source or switching the light sources at different positions. The adjustment of the position of the light source in the illumination system allows the exit angle of the beam emitted from the light source to be deflected, which can also eliminate the stray light.

Figure 5:
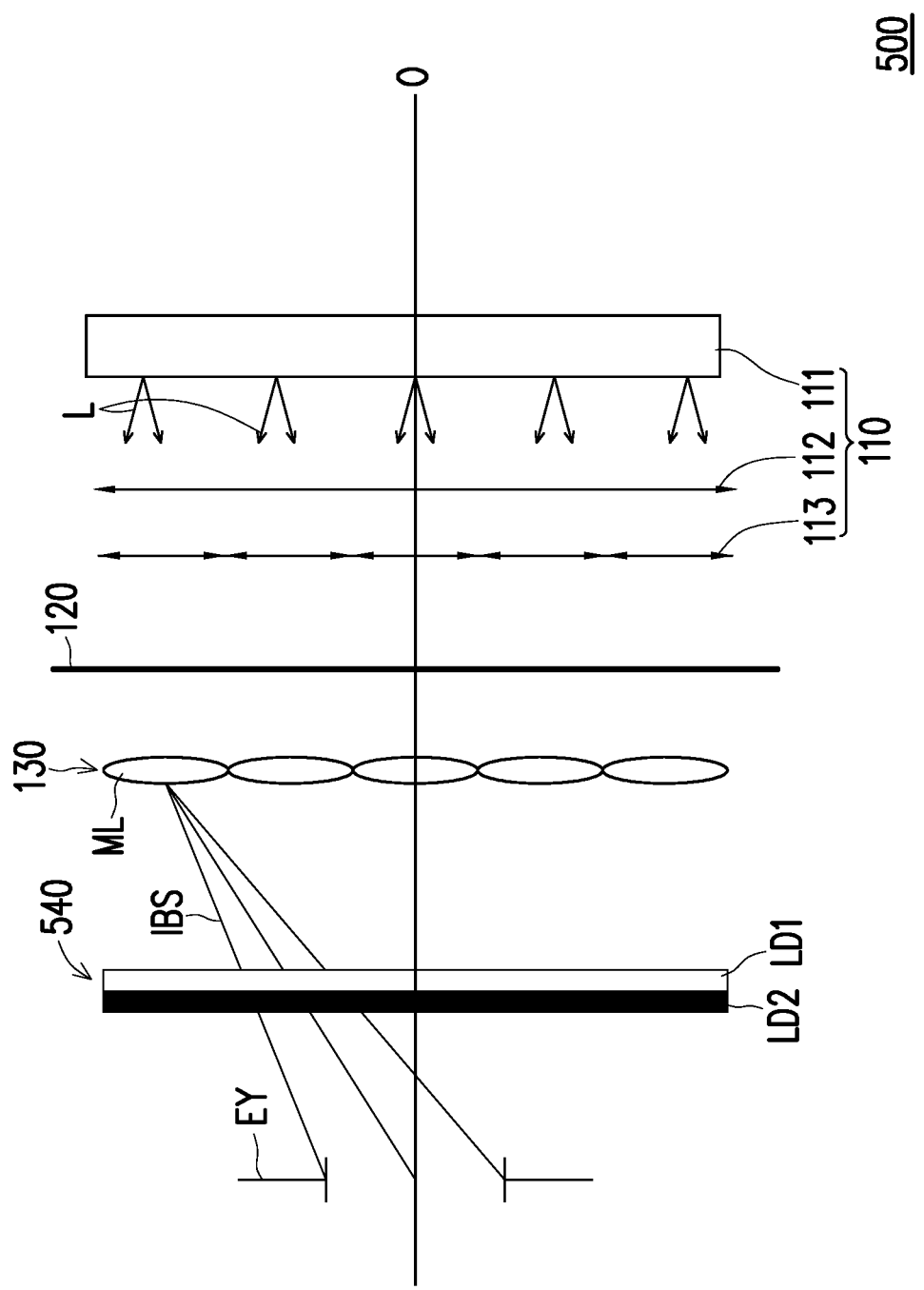
FIG. 5 is a schematic view illustrating a structure of another near-eye display apparatus according to an embodiment of the invention.
Figure 6A:
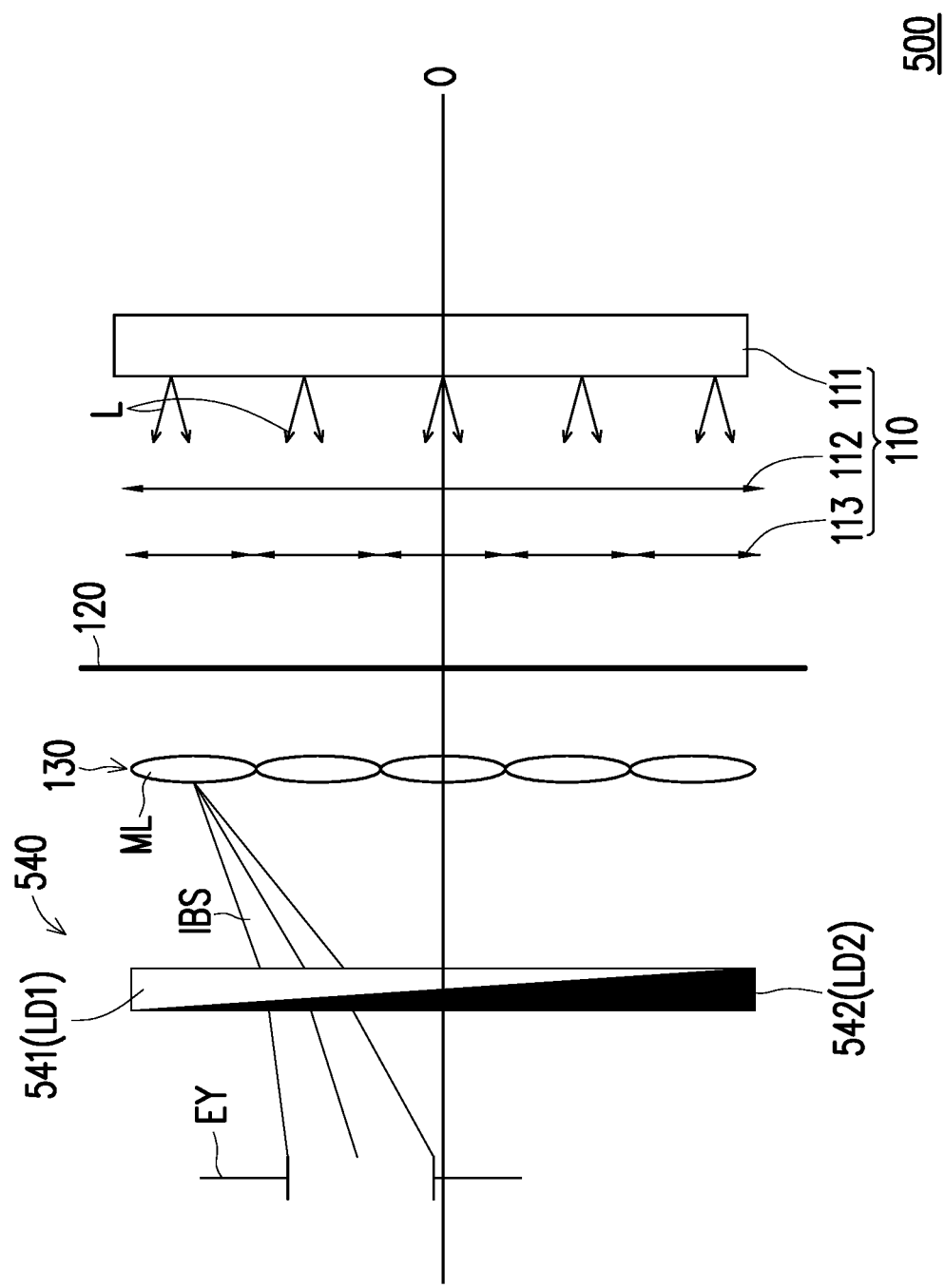
FIG. 6A and FIG. 6B are schematic views illustrating imaging light paths through a light deflecting device when a user's eyes deviate from an optical axis of the near-eye display apparatus depicted in FIG. 5.
Figure 6B:
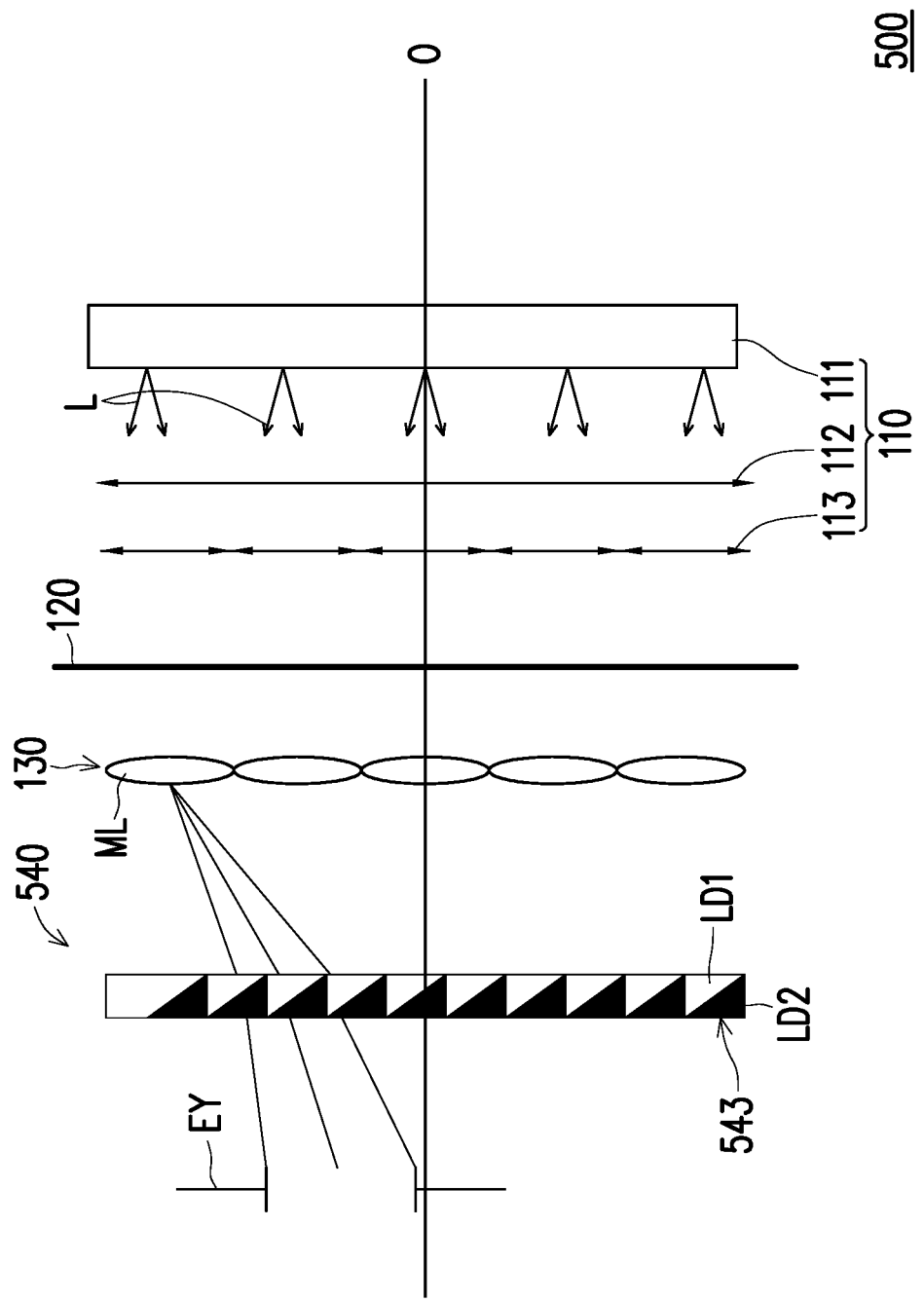

FIG. 5 is a schematic view illustrating a structure of another near-eye display apparatus according to an embodiment of the invention. FIG. 6A and FIG. 6B are schematic views illustrating imaging light paths through a light deflecting device when a user's eyes deviate from an optical axis of the near-eye display apparatus depicted in FIG. 5. With reference to FIG. 5, the near-eye display apparatus 500 provided in the embodiment is similar to the near-eye display apparatus 100 depicted in FIG. 1A, while the differences therebetween are described below. In the embodiment, the near-eye display apparatus 500 further includes a light deflecting device 540 located on transmission paths of the sub-image beams IBS and located between the microlens array 130 and the at least one eye EY. For instance, in the embodiment, the light deflecting device 540 may be a liquid lens, but the invention is not limited thereto. In other embodiments, the light deflecting device 540 may also be a liquid crystal lens.

Specifically, as shown in FIG. 5, according to the embodiment, the light deflecting device 540 includes first liquid LD1 and second liquid LD2. A refractive index of the first liquid LD1 is different from a refractive index of the second liquid LD2. After each of the sub-image beams IBS coming from the display device 120 enters the light deflecting device 540 and sequentially passes through the first liquid LD1 and the second liquid LD2, the sub-image beams are refracted to the at least one eye EY. On the other hand, as illustrated in FIG. 6A and FIG. 6B, according to the embodiment, when the position of the pupil of the at least one eye EY of the user deviates, an eyeball detecting device of the near-eye display apparatus may be applied to detect the position of the pupil of the at least one eye EY of the user, so as to automatically adjust the imaging position; alternatively, the user may manually adjust the imaging position according to the position of the pupil of his or her eye EY. Here, the imaging position of the sub-image beams IBS may be adjusted by adjusting an included angle between incident directions of the sub-image beams IBS and an interface between the first liquid LD1 and the second liquid LD2. For instance, in the embodiment, the included angle between the incident directions of the sub-image beams IBS and the interface between the first liquid LD1 and the second liquid LD2 may be modulated by applying different voltages to the light deflecting device 540 at different positions.

Particularly, as illustrated in FIG. 6A, in the embodiment, the light deflecting device 540 includes a first light deflecting unit 541 and a second light deflecting unit 542 adjacent to each other, the first liquid LD1 is located in the first light deflecting unit 541, and the second liquid LD2 is located in the second light deflecting unit 542. Namely, in the embodiment, the light deflecting device 540 is a one-piece liquid lens. As such, in the embodiment, different voltages may be applied to two side edges of the light deflecting device 540 to modulate the included angle between the incident directions of the sub-image beams IBS and the interface between the first liquid LD1 and second liquid LD2. Thereby, the sub-image beams IBS are able to enter the at least one eye EY of the user through the refraction by the first liquid LD1, the second liquid LD2, and the interface therebetween, and the dark lines can be eliminated, so as to ensure the good image quality of the near-eye display apparatus 500.

In another aspect, as shown in FIG. 6B, in the embodiment, the light deflecting device 540 includes a plurality of light deflecting units 543, each of the light deflecting units 543 has the first liquid LD1 and the second liquid LD2, and the light deflecting units 543 are arranged in an array. That is, in the embodiment, the light deflecting device 540 is a liquid lens array. As such, in the embodiment, different voltages may be applied to two side edges of each light deflecting unit 543 of the light deflecting device 540 to modulate the included angle between the incident directions of the sub-image beams IBS and the interface between the first liquid LD1 and second liquid LD2. Thereby, the sub-image beams IBS are able to enter the at least one eye EY of the user through the refraction by the first liquid LD1 of each light deflecting unit 543, the second liquid LD2 of each light deflecting unit 543, and the interface therebetween, and the dark lines can be eliminated, so as to ensure the good image quality of the near-eye display apparatus 500.

Besides, in another embodiment where the light deflecting device 540 is a liquid crystal lens, different voltages may be applied to edges of liquid crystal molecules in different regions of the light deflecting device 540 to modulate the refractive index in different regions of the light deflecting device 540. Thereby, the moving direction of the sub-image beams IBS may be adjusted through the refraction by different regions of the light deflecting device 540, and sub-image beams IBS are able to enter at least one eye EY of the user, so as to eliminate the dark lines and ensure the near-eye display apparatus 500 to have good image quality.

Figure 7:
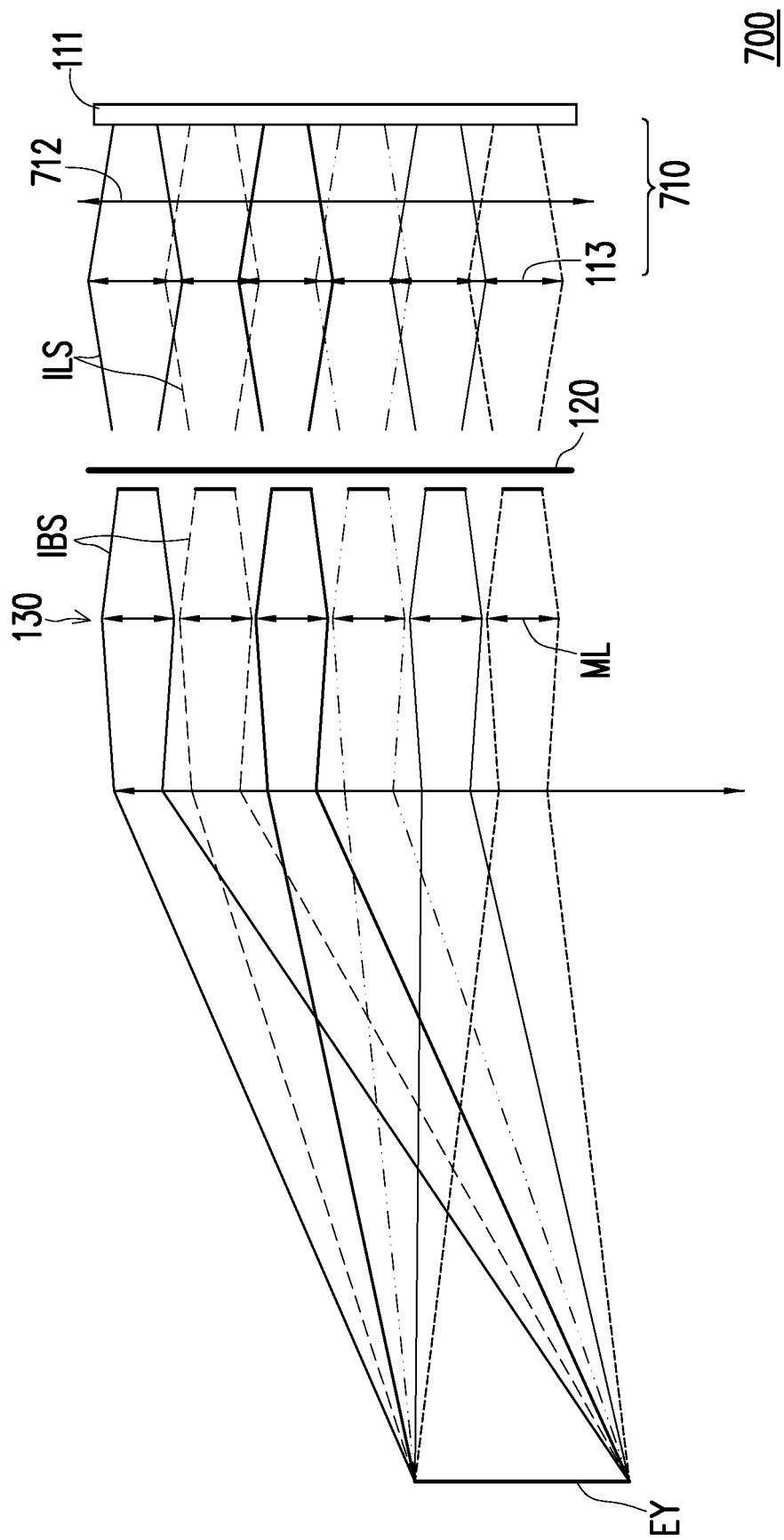
FIG. 7 is a schematic view illustrating a structure of another near-eye display apparatus according to an embodiment of the invention.

FIG. 7 is a schematic view illustrating a structure of another near-eye display apparatus according to an embodiment of the invention. With reference to FIG. 7, the near-eye display apparatus 700 provided in the embodiment is similar to the near-eye display apparatus 100 depicted in FIG. 1A, while the differences therebetween are described below. According to the embodiment, the focal length of the main lens 712 in the illumination system 710 may be infinite. That is, in the embodiment, the optical characteristics of the main lens 712 are equivalent to those of a planar plate, and thus the beams L provided by the light source 111 in the illumination system 710 are mainly refracted to the display device 120 through the lens array 113; as such, telecentric illumination can be accomplished, and each sub-illumination region IR can be correspondingly formed.

Specifically, as shown in FIG. 7, according to the t embodiment, the near-eye display apparatus 700 can satisfy the illumination requirements of different sub-illumination regions IR on the display device 120 through the configuration of the sub-illumination beams ILS of the illumination system 710, whereby the near-eye display apparatus 700 is able to control the light pattern distribution of the sub-image beams IBS. Accordingly, the near-eye display apparatus 700 can control the main exit angles of different sub-image beams IBS and the range of the exit angles to eliminate the stray light and ensure good image quality. Since the effects achieved by the near-dye display apparatuses 700 and 100 and the advantages of the near-dye display apparatuses 700 and 100 are similar, no further explanation will be provided hereinafter. Besides, as illustrated in FIG. 7, the near-eye display apparatus 700 further includes a lens (not marked) disposed between the micro-lens array 130 and the eye EY, and the lens is configured to correct large-angle aberrations of the sub-image beams IBS coming from the edge of the micro-lens array 130 and the display device 120, so as to improve the imaging quality of the image edge.

To sum up, one or more embodiments provided herein have at least one of the following advantages or achieve at least one of the following effects. In one or more embodiments of the invention, the near-eye display apparatus can satisfy illumination requirements of different sub-illumination regions on the display device through the configuration of the sub-illumination beams of the illumination system, whereby the near-eye display apparatus is able to control the light pattern distribution of the sub-image beams. As such, the near-eye display apparatus can control the main exit angles of different sub-image beams and the range of the exit angles to eliminate the stray light and ensure good image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A near-eye display apparatus configured for being disposed in front of at least one eye of a user, the near-eye display apparatus comprising: an illumination system, a display device, and a micro-lens array, wherein:
   the illumination system is configured to provide an illumination beam comprising a plurality of sub-illumination beams, and
   the display device is located on a transmission path of the illumination beam, the plurality of sub-illumination beams forming a plurality of sub-illumination regions on the display device, wherein the display device is configured to convert the plurality of sub-illumination beams irradiating the display device and corresponding to the plurality of sub-illumination regions into a plurality of sub-image beams, and an exit angle of each of the plurality of sub-image beams emitted from the display device is less than or equal to 20 degrees; and
   the micro-lens array being located on a transmission path of the plurality of sub-image beams and configured to transmit the plurality of sub-image beams to the at least one eye of the user, so as to display at least one virtual image,
   wherein the plurality of sub-illumination regions comprising a central sub-illumination region and a plurality of edge sub-illumination regions, and the plurality of edge sub-illumination regions collectively surround the central sub-illumination region, wherein a range of the exit angle of the sub-image beam located in the central sub-illumination region and a range of the exit angle of the sub-image beams located in the plurality of edge sub-illumination regions are about 0 degree±10 degrees.

2. The near-eye display apparatus according to claim 1, the illumination system comprising a light source, a main lens, and a lens array, wherein:
   the light source is configured to provide a plurality of beams, and
   the main lens and the lens array are located on a transmission path of the plurality of beams, the main lens is located between the light source and the lens array, and the plurality of beams correspondingly form a plurality of sub-illumination beams after passing through the lens array.

3. The near-eye display apparatus according to claim 2, wherein a range of an exit angle of each of the plurality of beams is from about 10 degrees to about 20 degrees.

4. The near-eye display apparatus according to claim 2, wherein the main lens is adapted to move relative to the lens array.

5. The near-eye display apparatus according to claim 1, further comprising:
   a light deflecting device, located on the transmission path of the plurality of sub-image beams and located between the micro-lens array and the at least one eye.

6. The near-eye display apparatus according to claim 5, wherein the light deflecting device is a liquid lens or a liquid crystal lens.

7. The near-eye display apparatus according to claim 5, wherein the light deflecting device comprises first liquid and second liquid, a refractive index of the first liquid is different from a refractive index of the second liquid, and each of the plurality of sub-image beams is refracted to the at least one eye after sequentially passing through the first liquid and the second liquid.

8. The near-eye display apparatus according to claim 7, wherein the light deflecting device comprises a plurality of light deflecting units, and each of the plurality of light deflecting units has the first liquid and the second liquid, the plurality of light deflecting units being arranged in an array.

9. The near-eye display apparatus according to claim 7, wherein the light deflecting device comprises a first light deflecting unit and a second light deflecting unit, the first liquid is located in the first light deflecting unit, and the second liquid is located in the second light deflecting unit.

10. The near-eye display apparatus according to claim 7, wherein an included angle between incident directions of the plurality of sub-image beams and an interface between the first liquid and the second liquid is changed by applying a voltage to the light deflecting device.

11. The near-eye display apparatus according to claim 1, wherein the micro-lens array comprises a plurality of micro-lenses, each of the plurality of micro-lenses corresponds to at least one of the plurality of sub-image beams, and the at least one of the sub-image beams is transmitted to the at least one eye through the corresponding micro-lens.

12. The near-eye display apparatus according to claim 2, wherein the main lens may be a Fresnel lens, a liquid crystal lens, or a liquid lens in a form.

13. The near-eye display apparatus according to claim 1, wherein a range of an incident angle of the sub-illumination beam irradiating the central sub-illumination region is equal to a range of incident angles of the sub-illumination beams irradiating the plurality of edge sub-illumination regions.

14. The near-eye display apparatus according to claim 1, wherein the range of the exit angle of the sub-image beam located in the central sub-illumination region is equal to the range of the exit angle of the sub-image beams located in the plurality of edge sub-illumination regions.

15. A near-eye display apparatus configured for being disposed in front of at least one eye of a user, the near-eye display apparatus comprising: an illumination system, a display device, and a micro-lens array, wherein:

the illumination system is configured to provide an illumination beam comprising a plurality of sub-illumination beams, and the display device is located on a transmission path of the illumination beam, the plurality of sub-illumination beams forming a plurality of sub-illumination regions on the display device, wherein the display device is configured to convert the plurality of sub-illumination beams irradiating the display device and corresponding to the plurality of sub-illumination regions into a plurality of sub-image beams, and an exit angle of each of the plurality of sub-image beams emitted from the display device is less than or equal to 20 degrees;

the micro-lens array being located on a transmission path of the plurality of sub-image beams and configured to transmit the plurality of sub-image beams to the at least one eye of the user, so as to display at least one virtual image; and a light deflecting device, located on the transmission path of the plurality of sub-image beams and located between the micro-lens array and the at least one eye, wherein the light deflecting device comprises first liquid and second liquid, a refractive index of the first liquid is different from a refractive index of the second liquid, and each of the plurality of sub-image beams is refracted to the at least one eye after sequentially passing through the first liquid and the second liquid.

* * * * *